United States Patent
Handa

(10) Patent No.: US 8,566,458 B2
(45) Date of Patent: Oct. 22, 2013

(54) COMMUNICATION DEVICE AND RESPONSE METHOD THEREOF

(75) Inventor: Masahiro Handa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 12/204,070

(22) Filed: Sep. 4, 2008

(65) Prior Publication Data

US 2009/0070475 A1  Mar. 12, 2009

(30) Foreign Application Priority Data

Sep. 11, 2007  (JP) .................................. 2007-235415

(51) Int. Cl.
*G06F 15/16* (2006.01)

(52) U.S. Cl.
USPC ............ 709/228; 709/203; 709/223; 709/227

(58) Field of Classification Search
USPC .................. 709/203, 218, 220, 223, 227, 228
See application file for complete search history.

(56) References Cited

U.S. PATENT DOCUMENTS

| | | | |
|---|---|---|---|
| 6,853,841 B1* | 2/2005 | St. Pierre | 709/203 |
| 7,908,258 B2* | 3/2011 | Kudo et al. | 707/705 |
| 8,254,254 B2* | 8/2012 | Handa | 370/230 |
| 2004/0010561 A1* | 1/2004 | Kim et al. | 709/208 |
| 2006/0112171 A1* | 5/2006 | Rader | 709/218 |
| 2006/0224897 A1 | 10/2006 | Kikuchi et al. | |
| 2007/0147230 A1* | 6/2007 | Yasuda | 370/214 |
| 2007/0237090 A1* | 10/2007 | Kim et al. | 370/252 |
| 2009/0049285 A1* | 2/2009 | Kurosawa | 712/225 |
| 2009/0307307 A1* | 12/2009 | Igarashi | 709/203 |
| 2011/0029679 A1* | 2/2011 | Handa | 709/228 |

FOREIGN PATENT DOCUMENTS

| | | |
|---|---|---|
| JP | 2005-33528 | 2/2005 |
| JP | 2006-140973 A | 6/2006 |
| JP | 2006-309698 A | 11/2006 |

* cited by examiner

*Primary Examiner* — Ramy M Osman
(74) *Attorney, Agent, or Firm* — Fitzpatrick, Cella, Harper & Scinto

(57) ABSTRACT

A communication device connected to a first network receives a connection request transmitted from a second network, and sets a service existing in the first network to a data request wait state in accordance with receiving the connection request. The communication device transmits a response to the connection request in accordance with the service having been set to a data request wait state.

9 Claims, 12 Drawing Sheets

FIG. 8

```
<?xml version="1.0" encoding="utf-8"?>
<root xmlns="urn:schemas-upnp-org:device-1-0">
  <device>
    <deviceType>urn:schemas-upnp-org:device:MediaRenderer:1</deviceType>     801
    ..
    <serviceList>
      <service>
        <serviceType>urn:shemas-upnp-org:service:LowPowerDevice:1</serviceType>
        <serviceId>urn:upnp-org:serviceId:LowPowerDevice:1</serviceId>        802
        <SCPDURL>/LowPowerDevice.xml</SCPDURL>                                803
        <controlURL>/control</controlURL>    804
        ..
      </service>
      ..
    </serviceList>
  </device>
</root>
```

FIG. 9

```
<?xml version="1.0"encoding="utf-8"?>
<scpd xmlns="urn:schemas-upnp-org:service-1-0">
  :
<actionList>
                        901
  <action>
     <name>Wakeup</name>
  </action>
                        902
  <action>
     <name>GoToSleep</name>
     <argumentList>
                        903
       <argument>
        <name>PowerState</name>
           :
       </argument>
         :
     </argumentList>
  </action>
</actionList>
<serviceStateTable>
  :
</serviceStateTable>
</scpd>
```

COMMUNICATION DEVICE AND RESPONSE METHOD THEREOF

BACKGROUND OF THE INVENTION

1. Field of the Invention

The present invention relates to a communication device connected to a network and a method of responding to a connection request made to the communication device.

2. Description of the Related Art

Recently, it has become possible to connect devices such as a digital television, a hard disk recorder, and a personal computer to a network and to operate the respective devices in interaction with each other. Examples of such a network include a wireless LAN and a wired LAN. Specifications for exchanging data over a LAN include a protocol specified by the DLNA (Digital Living Network Alliance).

Meanwhile, a technique for realizing communication on an IP network based on a virtual communication channel (session) established between communication devices is becoming prevalent (for example, Japanese Patent Laid-Open No. 2005-33528). Session control protocols for establishing, maintaining and terminating such sessions between communication devices include a protocol referred to as SIP (Session Initiation Protocol; RFC3261). Specifications of SIP are disclosed by the IETF (Internet Engineering Task Force).

However, when executing a service existing on a different network, even if networks are interconnected, such a service cannot be received in a state where a desired service provider has not been initiated.

For example, there is a service performed based on session establishment between a digital television having a DMP function as stipulated by the DLNA and a storage server having a DMS function as stipulated by the DLNA. DMP stands for Digital Media Player and is a client that reproduces contents. In addition, DMS stands for Digital Media Server and is a server that provides contents.

In this example, if a service provider of the storage server is not running, the digital television is unable to receive the service from the storage server.

Furthermore, while other devices can be called up using SIP, devices that can be called up are limited to those supporting SIP.

Moreover, there are cases where a command for causing the service provider to assume a state in which data can be provided is unknown.

SUMMARY OF THE INVENTION

The present invention provides, prior to connecting a network, information on a service provider in the network to be connected.

In addition, the present invention is capable of providing, in advance, a command for causing the service provider to assume a state in which data can be provided.

Furthermore, according to the present invention, a service of a device not supporting a protocol related to session connection can be received.

Further features of the present invention will become apparent from the following description of exemplary embodiments (with reference to the attached drawings).

BRIEF DESCRIPTION OF THE DRAWINGS

FIG. 8 is a diagram showing an example of a response including device information to be transmitted in communication F004;

FIG. 9 is a diagram showing an example of a response to a GET command transmitted to a service description URL 803;

DESCRIPTION OF THE EMBODIMENTS

Figure 1:
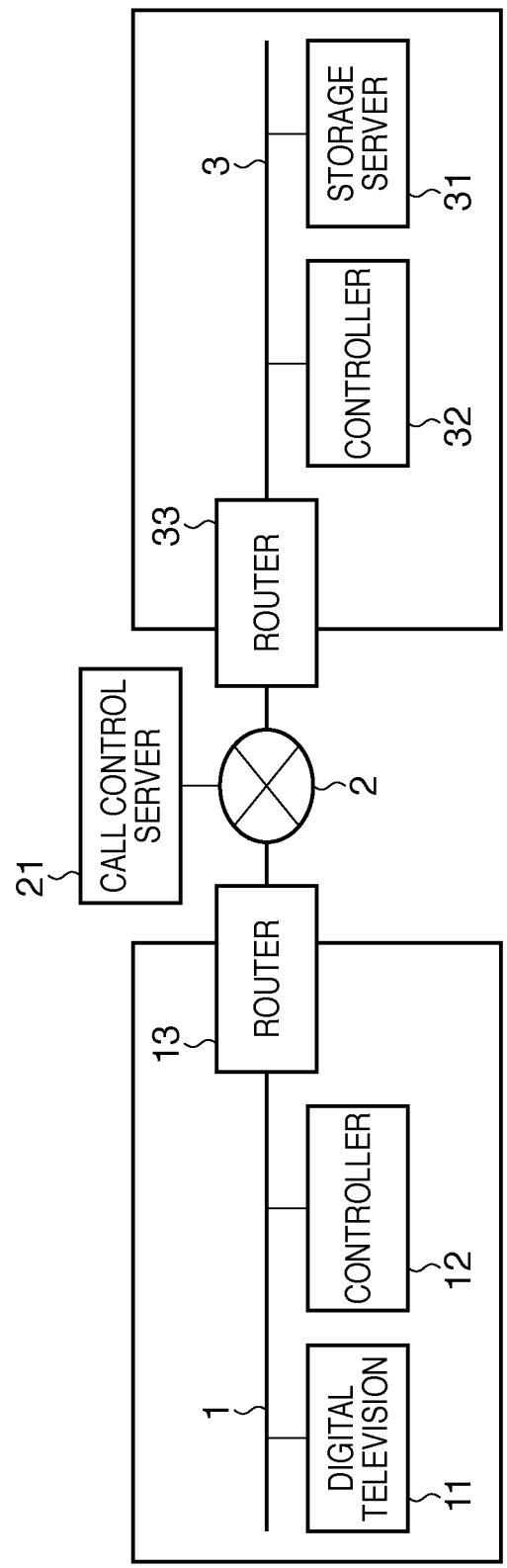
FIG. 1 is a diagram showing a network configuration according to a first embodiment.

FIG. 1 is a configuration diagram of a network system according to an embodiment of the present invention.

In FIG. 1, reference numerals 1 and 3 denote home networks to be respectively connected to the Internet 2 via routers 13 and 33. The home networks may either be a wireless LAN or a wired LAN. While the present embodiment is to be described using home networks as an example, the present invention is not intended to be limited to a home network and can also be applied to an office network or a factory network.

Reference numeral 11 denotes a digital television connected to the home network 1 and provided with a DMP function as stipulated by the DLNA. The digital television 11 is a device that provides a service in the home network 1. In the present embodiment, while devices supporting DLNA are connected in the home networks 1 and 3, devices supporting a protocol other than DLNA (and other than SIP) may be connected instead to the home networks 1 and 3.

Reference numeral 31 denotes a storage server connected to the home network 3 and provided with a DMS function as stipulated by the DLNA. The storage server 31 is a device that provides a service in the home network 3.

Reference numerals 12 and 32 are controllers respectively connected to the home network 1 and the home network 3 and which are provided with a CP (Control Point) function as stipulated by the DLNA. According to the DLNA, a CP is defined as a function for operating devices (digital television, storage server). In addition, the controller 12 and the controller 32 are provided with functions for establishing a session between a remote network or, in other words, executing a connection between the controller 12 and the controller 32 (between the home network 1 and the home network 3) using SIP. The controllers 12 and 32 are communication devices connected to networks (the home networks 1 and 3).

Reference numeral 2 denotes the Internet. However, reference numeral 2 may also denote, for example, a communication carrier network, an NGN (Next Generation Network), and the like as long as the network is an IP network.

Reference numerals 13 and 33 denote routers positioned between the Internet 2 and the home networks 1 and 3 and which are provided with communication transfer functions such as a NAT (Network Address Translation) traversal, a firewall, and the like. A part of the functions of the controllers 12 and 32 may be arranged to be performed by the routers 13 and 33.

Reference numeral 21 denotes a call control server residing in the Internet 2 and which provides various session control services such as address resolution or message transfer using SIP.

Figure 2:
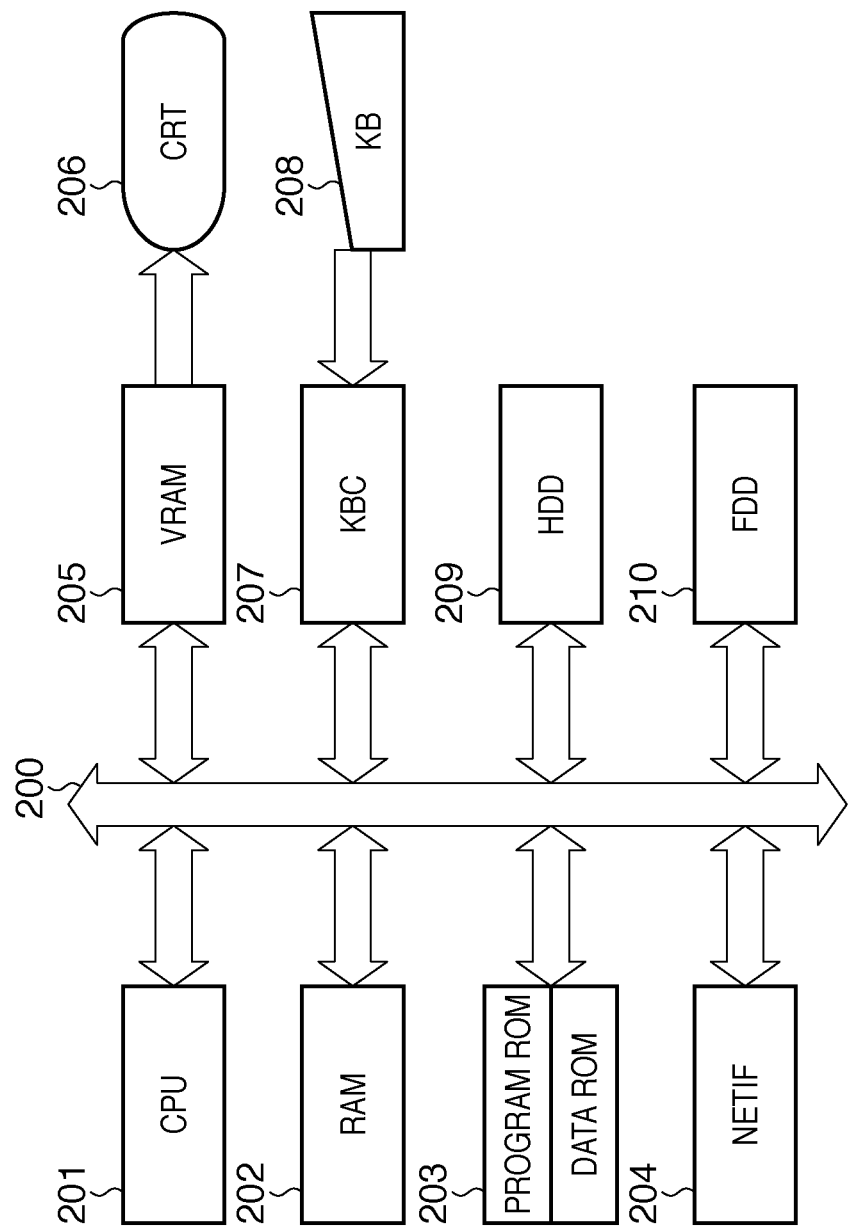
FIG. 2 is a diagram showing a hardware configuration of a controller.

FIG. 2 is a diagram showing a hardware configuration of the controllers 12 and 32 according to the present embodiment. The controllers 12 and 32 are communication devices connected to networks (the home networks 1 and 3).

Moreover, the controllers 12 and 32 are not limited to computer systems such as a PC (personal computer). In other words, besides a computer system, the present invention can also be implemented by a work station, a notebook PC, a palmtop PC, various home appliances having a built-in computer, a gaming console having a communication function, a mobile telephone, a PDA, a remote controller, and the like. In addition, the controllers 12 and 32 may be integrated with devices providing a data-receiving service and a data-supplying service.

Reference numeral 201 denotes a central processing unit (hereinafter referred to as a CPU) which controls the computer system. Reference numeral 202 denotes a random access memory (hereinafter referred to as a RAM) which functions as a main memory of the CPU 201 and as an executed program area, an execution area of the program, and a data area.

Reference numeral 203 denotes a read only memory (hereinafter referred to as a ROM) in which is recorded an operation processing procedure of the CPU 201. The ROM 203 includes a program ROM storing an operating system (OS) which is a system program that executes device control on a computer system and a data ROM storing information and the like necessary for running the system. In some cases, an HDD 209, to be hereinafter described, is used in place of the ROM 203.

Reference numeral 204 denotes a network interface (hereinafter referred to as a NETIF) which executes control for performing data transfer between computer systems via a network (such as the home network 1) and diagnostic evaluations of the connection status. The NETIF 204 of the controller 12 transmits/receives signals to/from the digital television 11 in the home network 1. In other words, from the NETIF 204, for example, the controller 12 performs transmission and reception of signals in relation to the respective steps of service search, service information acquisition and service start request respectively based on DLNA to be performed between the digital television 11 according to the present embodiment. In addition, the controller 12 performs reception and transfer of a signal for data request transmitted from a service-providing device or the controller 32 from the NETIF 204.

Furthermore, the NETIF 204 of the controller 12 transmits/receives signals to/from the controller 32 via the router 13, the Internet 2, and the router 33. In other words, from the NETIF 204, for example, the controller 12 performs transmission and reception of signals in relation to connection request, final response, response acknowledgment and the like according to SIP to be performed between the controller 32 according to the present embodiment.

The NETIF 204 of the controller 32 transmits/receives signals to/from the storage server 31 in the home network 3. In other words, from the NETIF 204, for example, the controller 32 performs transmission and reception of signals in relation to the respective steps of service search, service information acquisition and service start request respectively based on DLNA to be performed between the storage server 31 according to the present embodiment. In addition, the controller 32 performs reception and transfer of a signal for data request transmitted from a service-providing device or the controller 12 from the NETIF 204.

Furthermore, the NETIF 204 of the controller 32 transmits/receives signals to/from the controller 12 via the router 33, the Internet 2, and the router 13. In other words, from the NETIF 204, for example, the controller 32 performs transmission and reception of signals in relation to connection request, final response, response acknowledgment and the like according to SIP to be performed between the controller 12 according to the present embodiment.

Reference numeral 205 denotes a video RAM (hereinafter referred to as a VRAM) which develops an image to be displayed on a screen on a CRT 206, to be hereinafter described, and which indicates an operating condition of a computer system, and executes control of such displaying. Reference numeral 206 denotes a display device that is, for example, a display. The display device shall be hereinafter referred to as a CRT.

Reference numeral 207 denotes a controller that controls input signals from an external input device 208, to be described hereinafter. Reference numeral 208 is an external input device for accepting operations performed on the computer system by a user of the same, and may be, for example, a keyboard.

Reference numeral 209 denotes a storage device which may be, for example, a hard disk. The storage device 209 is used for storing application programs and data such as image information. Application programs according to the present embodiment refer to a software program that constitutes the present embodiment and which issues a service start instruction during session establishment procedures, and the like.

Reference numeral 210 denotes an external input/output device such as a floppy disk drive, a CD-ROM drive or the like into/from which a removable storage medium is inserted/ejected, and is used to perform readout from a medium containing the aforementioned application program. The external input/output device shall be hereinafter referred to as an FDD. The application programs and data to be stored in the HDD 209 can be also stored in the FDD 210 to be used therefrom.

Reference numeral 200 denotes an input/output bus (address bus, data bus, and control bus) to be connected between the respective units described above.

Figure 3:
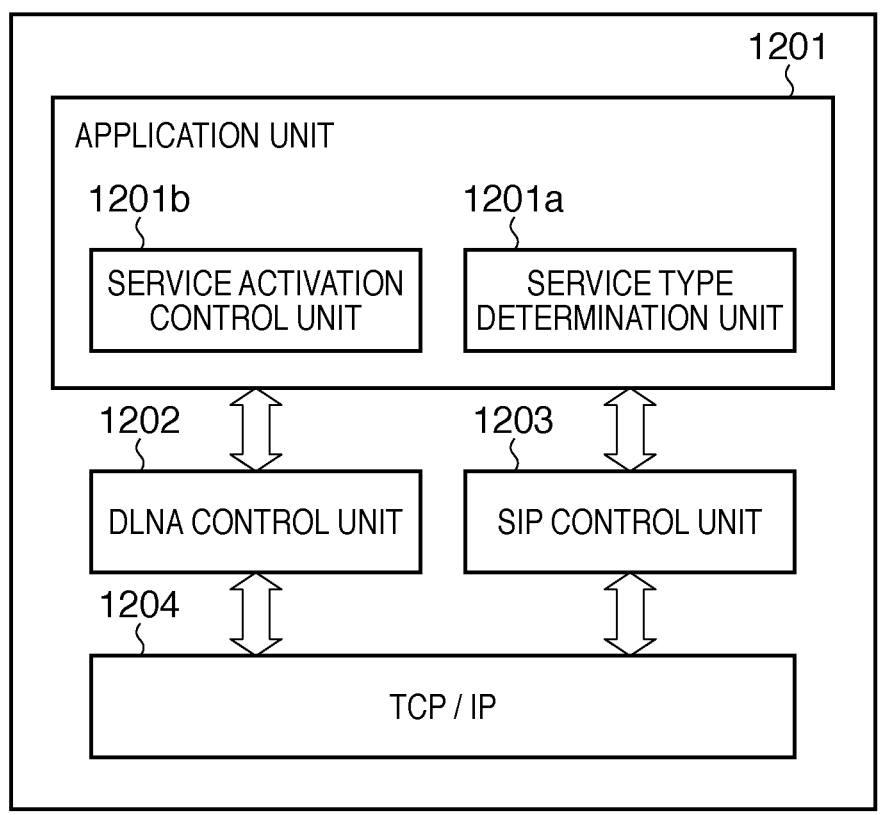
FIG. 3 is a diagram showing a software configuration of controllers 12 and 32.

Next, a software configuration of the controllers 12 and 32 in regards to the present embodiment will be described. FIG. 3 is a diagram showing a software configuration according to the present embodiment. The software is, for example, stored in the HDD 209 and read out as required by the CPU 201 into the RAM 202 to be executed.

Reference numeral 1201 denotes an application unit that performs service control and the like, and includes a service type determination unit 1201a and a service activation control unit 1201b to be described hereinafter.

The service type determination unit 1201a determines whether a service type of a service-providing device (the storage server 31, the digital television 11) is a data-supplying service or a data-receiving service.

The service activation control unit 1201b issues an instruction for starting a service based on a determination result of the service type determination unit 1201a.

Reference numeral 1202 denotes a DLNA control unit that transmits and receives control messages in compliance with various protocols as stipulated by the DLNA in order to discover a service-providing device or to give the instruction for the start of service. In addition, the DLNA control unit 1202 acknowledges that a service of a device has been started by receiving a response from the device providing the service.

Reference numeral 1203 denotes an SIP control unit that transmits and receives control messages in compliance with SIP regulations in order to establish a session between the controllers 12 and 32.

Reference numeral 1204 denotes a TCP/IP which, using the TCP/IP protocol normally used by communication networks, transfers messages to be exchanged by the DLNA control unit 1202 or the SIP control unit 1203.

The DLNA control unit 1202, the SIP control unit 1203 and the TCP/IP 1204 are to be provided as middleware or as parts of the OS (operating system).

The application unit 1201 of the controller 12 communicates with (the application unit 1201 of) the controller 32 via the DLNA control unit 1202 and the TCP/IP 1204. In addition, the application unit 1201 of the controller 12 communicates with the digital television 11 via the SIP control unit 1203 and the TCP/IP 1204. The application unit 1201 of the controller 32 communicates with (the application unit 1201 of) the controller 12 via the DLNA control unit 1202 and the TCP/IP 1204. Furthermore, the application unit 1201 of the controller 32 communicates with the storage server 31 via the SIP control unit 1203 and the TCP/IP 1204.

Next, with respect to a service start procedure according to the present embodiment, a description will be given on a procedure in a case where the data-supplying service is the storage server, the data-receiving service is the digital television, and the session control protocol is SIP.

Figure 4:
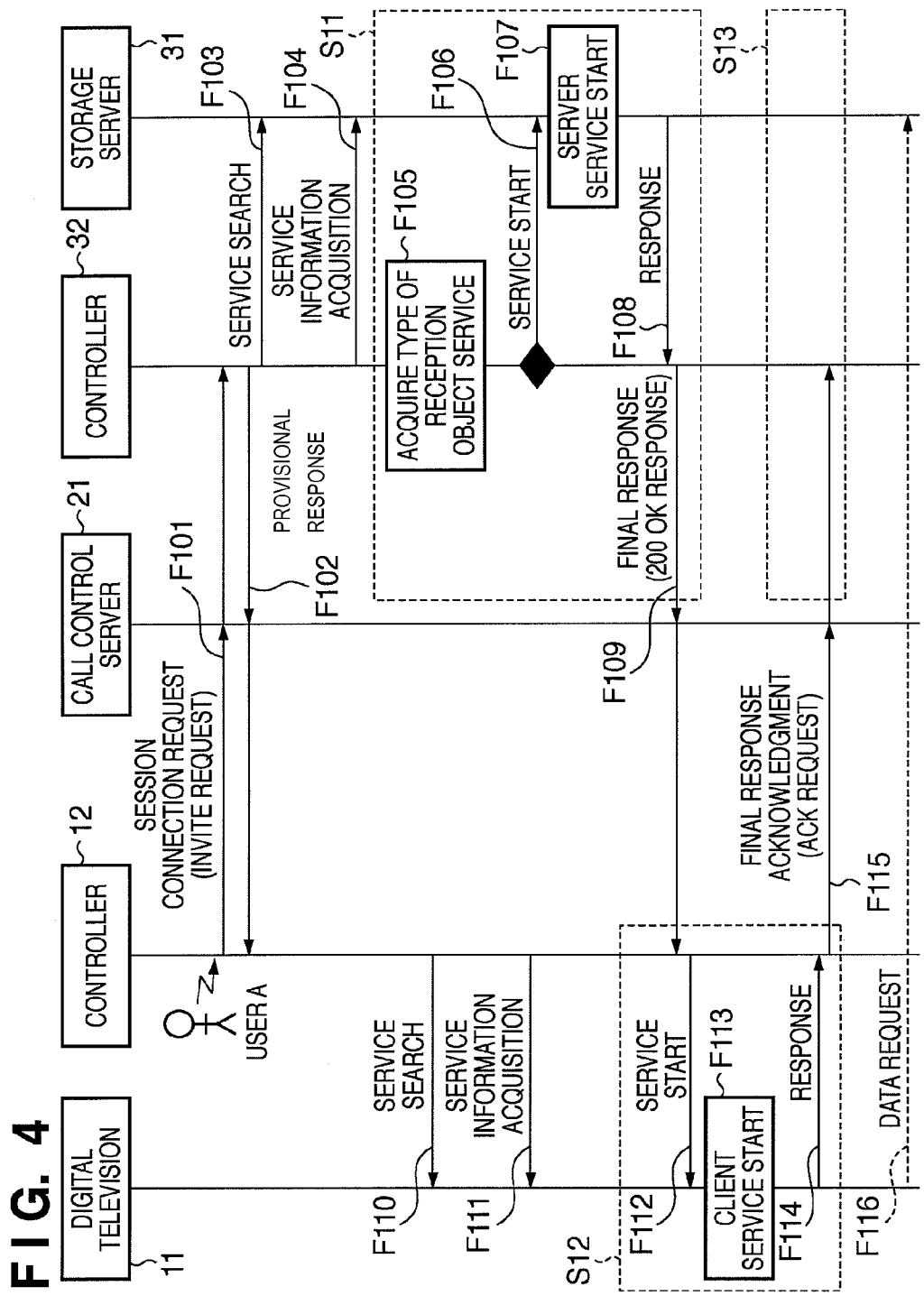
FIG. 4 is a diagram showing a service start sequence in the case where a session connection request is transmitted by a data-receiving service-side.

First, a service start procedure in a case where a session connection request is transmitted by the controller 12 connected to the digital television 11 side network will be described with reference to FIG. 4. FIG. 4 shows a service start procedure of a case where the home network 1 is a transmitting-side network (second network) and the home network 3 is a receiving-side network (first network). In this case, an INVITE request F101 that is a connection request is transmitted from the home network 1 to the home network 3. More specifically, the user inputs an SIP URI (SIP Uniform Resource Identifier) of the controller 32 to the controller 12. Subsequently, a call control server 21 converts the SIP URI into an IP address and transfers the message from the controller 12 (in this case the INVITE request) to the controller 32.

In addition, a 200 OK response F115 that is a response to the INVITE request is transmitted from the home network 3 to the home network 1.

In communication F101 shown in FIG. 4, based on an instruction from user A, the SIP control unit 1203 of the controller 12 to be connected to the home network 1 transmits an SIP INVITE request (connection request) to the controller 32 to be connected to the home network 3. In other words, the SIP control unit 1203 of the controller 32 transmits a connection request from the NETIF 204 according to a protocol (SIP) for connecting a session. At this point, for example, the user A gives the instruction for video watching, whereby the SIP control unit 1203 of the controller 12 generates SDP information based on the video watching-instruction from the user A and adds the same to the body of the INVITE request. Moreover, SDP stands for Service Description Protocol, whereby SDP information represents, for example, media information such as media type and the like, and information on data communication direction and the like.

Figure 7:
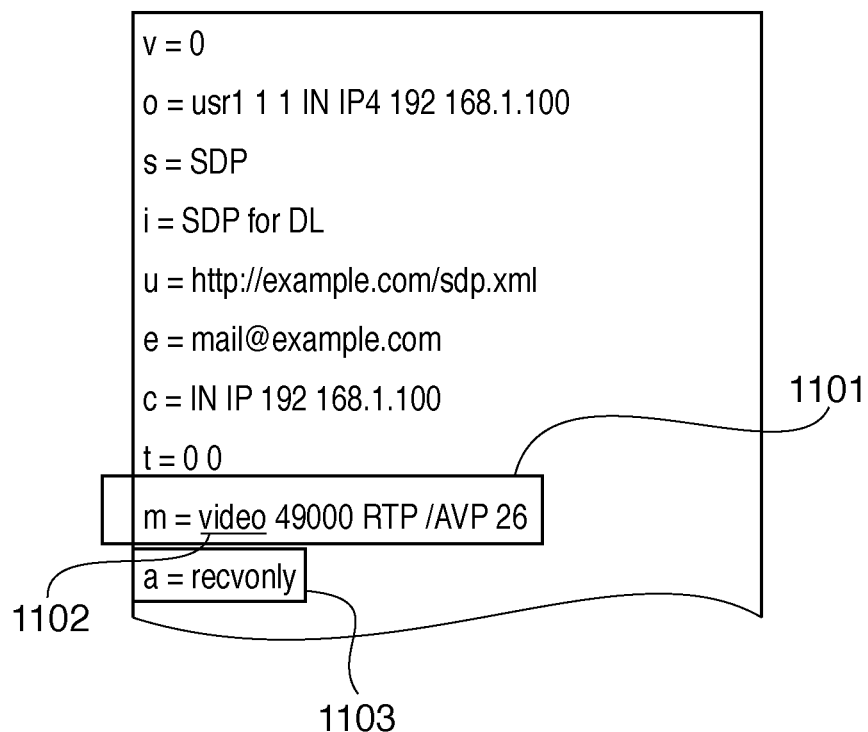
FIG. 7 is a diagram showing an example of SDP information according to the present embodiment.

An example of SDP information to be added to an INVITE request is shown in FIG. 7. In FIG. 7, media information corresponds to reference numeral 1101, media type information (a part of media information) to 1102, and data communication direction to 1103. In the case of video watching as with the present embodiment, for example, "video" is presented as the media type 1102 and "recvonly" is presented as the data communication direction 1103. In this case, in accordance with specifications formulated and disclosed by the IETF, "recvonly" indicates that the service is primarily a "receiving service".

The SIP control unit 1203 of the controller 32 receives an INVITE request that is a connection request transmitted from the network (the home network 1). In other words, the SIP control unit 1203 of the controller 32 receives a connection request from the NETIF 204 transmitted according to a protocol (SIP) for connecting a session.

The DLNA control unit 1202 of the controller 32 having received the INVITE request at the SIP control unit 1203 searches for a service-providing device on the home network 3 using SSDP to be hereinafter described (F103). Based on information obtained through the SSDP processing, the DLNA control unit 1202 discovers the storage server 31 on the home network 3. SSDP stands for Simple Service Discovery Protocol.

Subsequently, the DLNA control unit 1202 of the controller 32 makes a service information acquisition request to the storage server 31, and acquires information on a command for controlling the service of the storage server 31, and the like (F104). The discovery of a service-providing device and the acquisition of service information and the like in communications F103 and F104 can either be performed after receiving the INVITE request (F101) or be performed in advance before receiving the same. Details on processing performed in communications F103 and F104 shall be described later.

Furthermore, the service type determination unit 1201a of the controller 32 determines the type of service requested by the home network 1 side based on "recvonly" that is information indicating data communication direction and which is included in the INVITE request SDP information (F105). In the case of the present embodiment, the type of the service is determined to be a data-supplying service.

In this case, the service activation control unit 1201b of the controller 32 transmits a command giving the instruction for the start of service (service start request) from the NETIF 204 to the storage server 31 providing the data-supplying service (F106). In other words, the service activation control unit 1201b of the controller 32 sets the service existing in the network (the home network 3) to a data request wait state in accordance with the reception of the INVITE request (F101) that is a connection request. At this point, the service activation control unit 1201b of the controller 32 sets the service existing in the network (the home network 3) to a data request wait state using a protocol for controlling devices in a local network (DLNA). The service start request command has already been acquired in communication F104.

The storage server 31 having received the service start request performs start processing of its own service and sets the service to a data request wait state (F107).

When the storage server 31 completes the service start processing and is set to a data request wait state, the storage server 31 transmits a response to the DLNA control unit 1202 of the controller 32 (F108). At this point, the storage server 31 transmits the response to the DLNA control unit 1202 using a protocol for controlling devices in a local network (DLNA).

Meanwhile, the DLNA control unit 1202 of the controller 32 acknowledges that the storage server 31 has been set to a data request wait state by receiving a response (F108) via the NETIF 204. Subsequently, the SIP control unit 1203 of the controller 32 transmits a SIP 200 OK response (final response) signifying acceptance of the INVITE request from the NETIF 204 to the SIP control unit 1203 of the controller 12 (F109). In other words, the SIP control unit 1203 of the controller 32 transmits a response (200 OK response) to the INVITE request (connection request) after acknowledging that the service has been set to a data request wait state. At this point, the SIP control unit 1203 of the controller 32 transmits a response to the connection request from the NETIF 204 according to a protocol (SIP) for connecting a session.

The SIP control unit 1203 of the controller 32 transmits a 1xx response (provisional response) (F102) at an arbitrary timing between the reception of the INVITE request (F101) and the transmission of the 200 OK response (F109). By following this procedure, the network side which has transmitted the connection request can become aware of whether the storage server 31 is conducting a search or performing service start processing. Moreover, the 1xx response (F102) need not necessarily be transmitted.

In addition, in the case where the storage server 31 could not be discovered, the SIP control unit 1203 of the controller 32 returns a 4xx response (final response) signifying a rejection of the INVITE request in communication F109. Similar processing is also performed in cases where: the storage server 31 is discovered but is in a state in which the service cannot be provided; the storage server 31 is prevented from providing the service; the storage server 31 is unsuccessful in performing the service start processing, and the like. Upon receiving the 4xx response, the SIP control unit 1203 of the controller 12 determines that the session connection has failed and terminates the connection processing. By following this procedure, the network side which has transmitted the connection request can become aware of the fact that the session connection request has reached the controller 32 but the controller 32 is unable to receive the service. However, the 4xx response need not necessarily be transmitted.

The service activation control unit 1201b of the controller 12 having received the 200 OK response to the INVITE request at the SIP control unit 1203 makes a service start request to the digital television 11 (F112). At this point, discovery of the digital television 11 on the home network 1 is performed in communication F110 after transmission of the INVITE request (F101) according to the same procedure as communication F103. In addition, a command for service start request of the digital television 11 is acquired from the digital television 11 in communication F111 after transmission of the INVITE request (F101) according to the same procedure as communication F104. However, the discovery of the service-providing device and command acquisition as performed in communications F110 and F111 may also be performed in advance before communication F101 or upon reception of the final response in communication F109.

The digital television 11 having received the service start request performs data-receiving service start processing (F113). Furthermore, the digital television 11 having completed the data-receiving service start processing transmits a response to the controller 12 (F114).

The SIP control unit 1203 of the controller 12 having received the response transmitted in communication F114 at the DLNA control unit 1202 transmits an SIP ACK request (response acknowledgment) to the SIP control unit 1203 of the controller 32 (F115). According to the above, the home networks 1 and 3 are connected by the controllers 12 and 32.

Subsequently, after transmitting a response in communication F114, the digital television 11 performs access for requesting data to the storage server 31 (F116). At this point, the SIP control unit 1203 of the controller 12 forwards the data request (F116) to the SIP control unit 1203 of the controller 32. The DLNA control unit 1202 of the controller 32 forwards the data request (F116) to the storage server 31. As for the digital television 11, transmitting the data request (F116) via multicast shall suffice. In this manner, by having the controller 32 use DLNA commands, even when a service-providing device (the storage server 31) does not support a session connection protocol (SIP), the service can be used.

In addition, before the service start requests of communications F106 and F112, the DLNA control unit 1202 may make an inquiry to a device such as the storage server 31 or the digital television 11 from the NETIF 204 about the status of the device. Subsequently, the DLNA control unit 1202 acknowledges a service state such as a state where the device has been turned off or a state where the device is turned on but is unable to provide service, and selects a command for setting a data request wait state in accordance with the acknowledged state.

As shown, a session connection request is made from the data-receiving service-side network to the data-supplying service-side network, whereby the data-supplying service is started before starting the data-receiving service. Consequently, after the session is established, the device providing the data-supplying service can assume a state where data can be provided before the device receiving the data-supplying service requests data.

Figure 5:
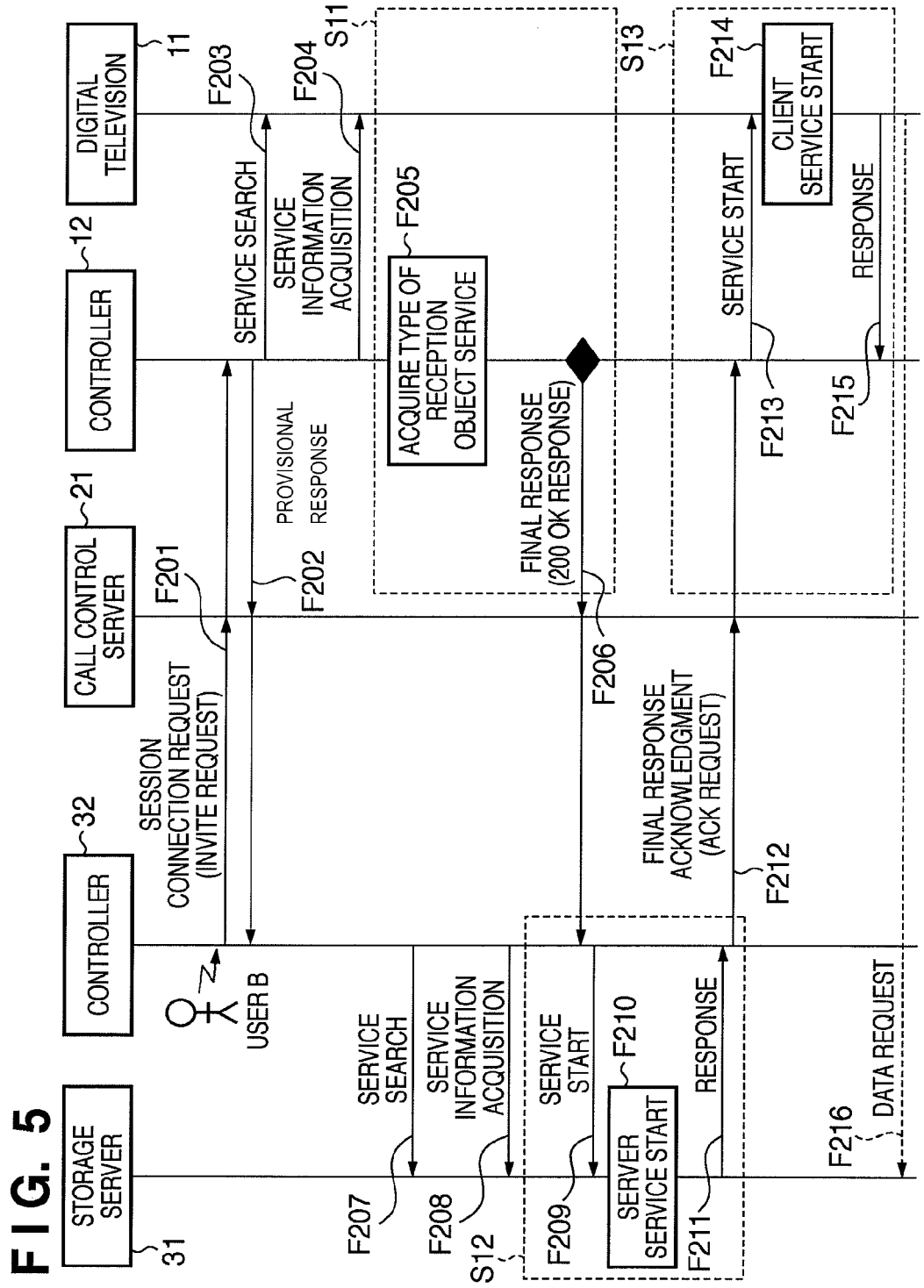
FIG. 5 is a diagram showing a service start sequence in the case where a session connection request is transmitted by a data-supplying service-side.

Next, a service start procedure in a case where a session connection request is transmitted by the controller 32 connected to the storage server 31 side network will be described with reference to FIG. 5. FIG. 5 shows a service start procedure of a case where the home network 3 is the transmitting-side network (second network) and the home network 1 is the receiving-side network (first network). In this case, an INVITE request that is a connection request is transmitted from the home network 3 to the home network 1 and a 200 OK response that is a response to the INVITE request is transmitted from the home network 1 to the home network 3.

In communication F201 shown in FIG. 5, based on an instruction from user B, the SIP control unit 1203 of the controller 32 to be connected to the home network 3 transmits an SIP INVITE request (connection request) to the controller 12 to be connected to the home network 1. In other words, in communication F201, the SIP control unit 1203 of the controller 32 transmits a connection request to the home network 1 from the NETIF 204 according to a protocol (SIP) for connecting a session. At this point, for example, the user B gives the instruction for a video to be supplied, whereby the controller 32 generates the aforementioned SDP information based on the instruction to supply a video from the user B and adds the same to the body of the INVITE request. In this case, for example, the media type of the SDP information is "video" and the data communication direction information is "sndonly". Moreover, in accordance with specifications formulated and disclosed by the IETF, "sndonly" indicates that the service is primarily a "supplying service".

The DLNA control unit 1202 of the controller 12 having received the INVITE request at the SIP control unit 1203 searches for a service-providing device on the home network 3 using SSDP to be hereinafter described (F203). Based on information obtained through the SSDP processing, the DLNA control unit 1202 discovers the digital television 11 on the home network 1.

Subsequently, the DLNA control unit 1202 of the controller 12 makes a service information acquisition request to the digital television 11, and acquires information on a command for controlling the service of the digital television 11 and the like (F204). The discovery of a service-providing device and the acquisition of service information and the like in communications F203 and F204 can either be performed after receiving the INVITE request (F201) or be performed in advance before receiving the same. Moreover, details on processing performed in communications F203 and F204 shall be described later.

Furthermore, the service type determination unit 1201a of the controller 12 determines the type of service requested from the home network 1 side based on "sndonly" that is information indicating data communication direction which is included in the INVITE request SDP information (F205). In the case of the present embodiment, the type of the service is determined to be a data-receiving service.

Accordingly, the service activation control unit 1201b of the controller 12 transmits a 200 OK response (final response) with respect to the INVITE request to the controller 32 before starting the service of the digital television 11 corresponding to the data-receiving service (F206).

The service activation control unit 1201b of the controller 32 having received the 200 OK response (final response) at the SIP control unit 1203 transmits a command giving the instruction for service start (service start request) to the storage server 31 (F209). In other words, the SIP control unit 1203 of the controller 32 receives a response to the connection request transmitted according to a protocol (SIP) for connecting a session at the NETIF 204. Furthermore, the service activation control unit 1201b of the controller 32 sets the service existing in the network (the home network 3) to a data request wait state using a protocol for controlling devices in a local network (DLNA). At this point, discovery of the storage server 31 on the home network 3 is performed in communication F207 after transmission of the INVITE request (F201) according to the same procedure as communication F203. In addition, a command for service start request of the storage server 31 is acquired from the storage server 31 in communication F208 after transmission of the INVITE request (F201) according to the same procedure as communication F204. However, the discovery of the service-providing device and command acquisition as performed in communications F207 and F208 may also be performed in advance before communication F201 or upon reception of the final response transmitted in communication F206.

The storage server 31 having received the service start request performs service start processing and sets itself to a data request wait state (F210). Furthermore, the storage server 31 set to the data request wait state transmits a response to the controller 32 (F211).

Meanwhile, the DLNA control unit 1202 of the controller 32 acknowledges that the storage server 31 has been set to a data request wait state by receiving the response. Subsequently, the SIP control unit 1203 of the controller 32 transmits an SIP ACK request (response acknowledgment) to the controller 12 (F212). In other words, the SIP control unit 1203 of the controller 32 transmits a response acknowledgment (ACK request) of the response (200 OK response) after acknowledging that the service existing in the network (the home network 3) has been set to a data request wait state. At this point, the SIP control unit 1203 of the controller 32 transmits the response acknowledgment to the response from the NETIF 204 according to a protocol (SIP) for connecting a session.

The service type determining unit 1201a of the controller 12 has determined in communication F205 that the requested service is the data-receiving service. In this case, the service activation control unit 1201b of the controller 12 having received the ACK request at the SIP control unit 1203 makes a service start request (F213) to the digital television 11 using a command for controlling the service acquired from the digital television 11.

The digital television 11 having received the service start request performs data-receiving service start processing (F214).

Furthermore, the digital television 11 having completed the data-receiving service start processing transmits a response to the DLNA control unit 1202 of the controller 12 (F215).

The digital television 11 having transmitted a response in communication F215 performs access for requesting data to the storage server 31 (F216).

In other words, in the case where the service to be performed in the network (the home network 1) is a data-receiving service, the SIP control unit 1203 of the controller 12 transmits a response (200 OK response) to the connection request (INVITE request). Furthermore, after receiving the response acknowledgment (ACK request) to the response (200 OK response), the service activation control unit 1201b of the controller 12 starts data request to the device providing the data-receiving service.

At this point, the SIP control unit 1203 of the controller 12 forwards the data request (F216) to the SIP control unit 1203 of the controller 32. The DLNA control unit 1202 of the controller 32 forwards the data request (F216) to the storage server 31. As for the digital television 11, transmitting the data request (F216) via multicast shall suffice. In this manner, by having the controller 12 use DLNA commands, even when a service-providing device (the digital television 11) does not support a session connection protocol (SIP), the service can be used.

As shown, in the case where a service is started by making a session connection request from the data-supplying service-side network to the data-receiving service-side network, the service of the storage server 31 is started before starting the data-receiving service of the digital television 11. Consequently, the device providing the data-receiving service can make a data request with respect to the data-supplying service after starting its own service.

In this case, the service start (F210) of the storage server 31 may be performed by an operation of the controller 32 or the storage server 31 before receiving the 200 OK response of communication F206. Consequently, the period of time from the reception of the 200 OK response (F206) to the transmission of the ACK request (F212) can be reduced.

Furthermore, in the present embodiment, the digital television 11 in FIG. 4 and the storage server 31 in FIG. 5 start services upon respectively receiving service start requests (F112, F207) from the service activation control units 1201b of the controllers 12 and 32. However, securing resources and the like for a service and setting a stand-by state may be performed in advance before the service start requests (F112, F207) are transmitted. Setting methods include: a method using a service control command transmitted from the DLNA control unit 1202 of the controller 32; operations on the digital television 11 and the storage server 31 by the user, and the like. Consequently, the period of time from the reception of the 200 OK response to the transmission of the ACK request can be reduced.

Next, with reference to FIG. 6, a description will be given on a procedure in which the DLNA control units 1202 of the controller 12 and the controller 32 discover service-providing devices connected to the respective home networks and acquire information on service types and commands for controlling services. While the description will be given using the case of FIG. 4 as an example, the DLNA control units 1202 of the controllers 12 and 32 shown in FIG. 5 also acquire information on service types and commands for controlling services according to the same procedure as will be described below.

Figure 6:
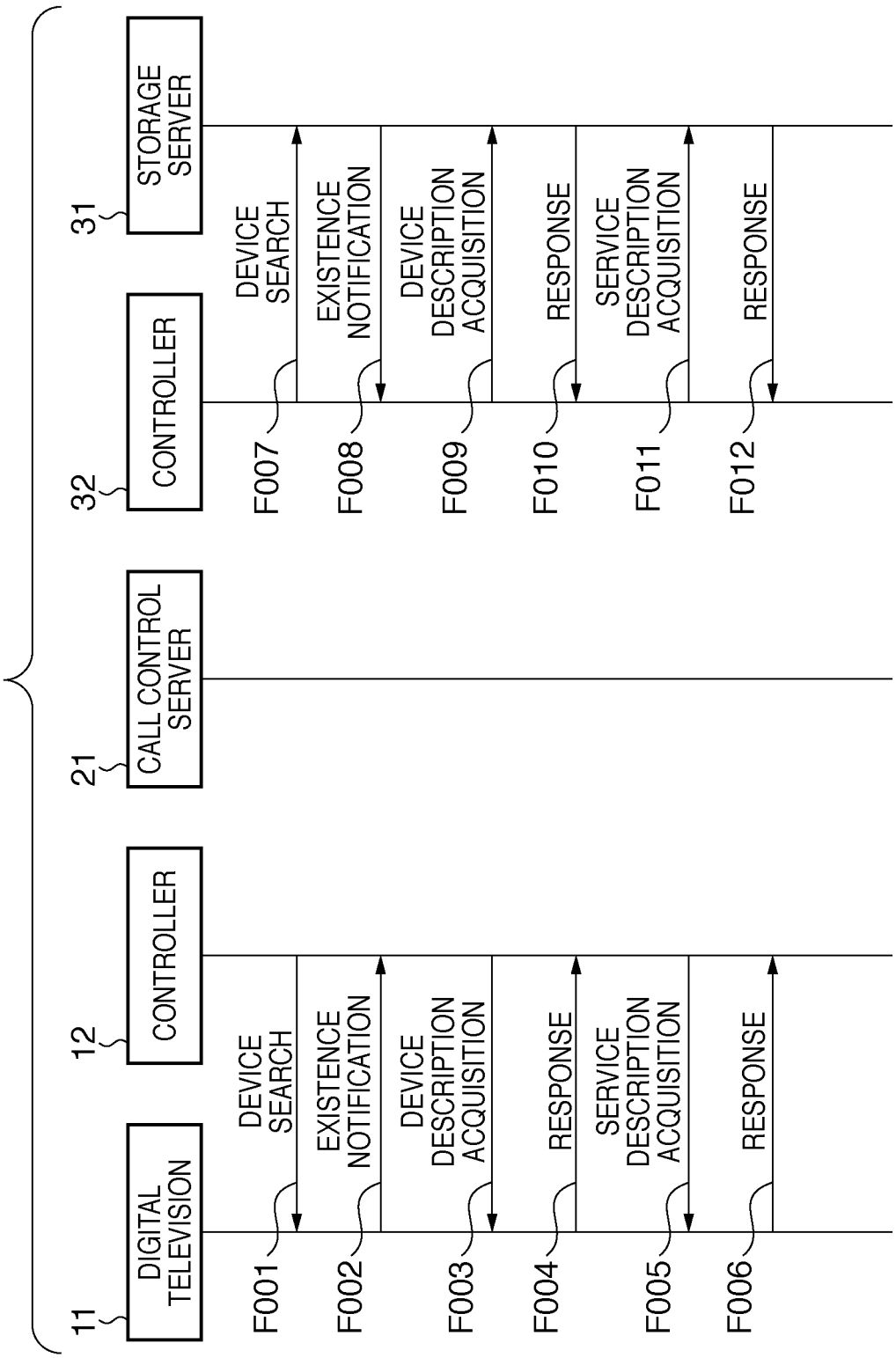
FIG. 6 is a diagram showing a sequence for acquiring information related to a service in a home network.

In FIG. 6, in order to search a service-providing device connected to the network (the home network 1), the DLNA control unit 1202 of the controller 12 transmits via multicast an M-Search message according to a service discovery protocol (F001). The service discovery protocol is SSDP (Simple Service Discovery Protocol). Subsequently, the digital television 11 having received the M-Search message returns a NOTIFY message describing an URL enabling access to information on its own device and the like to the DLNA control unit 1202 of the controller 12 (F002).

Having received the NOTIFY message, the DLNA control unit 1202 of the controller 12 transmits an HTTP GET command to the URL described in the NOTIFY message in order to acquire device information on the digital television 11 (F003). The URL indicates an address of a file in the digital television 11 in which device information is stored. Based on the URL, the digital television 11 having received the GET command reads out device information such as its own device type <deviceType> and a service list <serviceList>. Subsequently, the 200 OK response including the read-out device information is transmitted back to the DLNA control unit 1202 of the controller 12 (F004).

By receiving the 200 OK response transmitted from the digital television 11 in communication F004, the DLNA control unit 1202 of the controller 12 acquires an acquisition destination of a command for setting the service of the digital television 11 to a data request wait state.

Described in the service list are a service type <serviceType>, a service description URL <SCPDURL>, a control URL <controlURL> and the like for each service.

FIG. 8 shows an example of the 200 OK response transmitted back in communication F004.

In FIG. 8, reference numeral 801 denotes a device type of the digital television 11.

Reference numeral 802 denotes a service type supported by the digital television 11.

Reference numeral 803 denotes a URL including a file name of a file describing detailed information of services supported by the digital television 11. Reference numeral 803 denotes a service description URL and represents an acquisition destination of a command.

Reference numeral 804 denotes a transmission destination URL of a SOAP request. SOAP stands for Simple Object Access Protocol.

In communication F004, the DLNA control unit 1202 of the controller 12 receives a 200 OK response. The DLNA control unit 1202 of the controller 12 transmits an HTTP GET command to each URL described in the service list in order to acquire detailed information on a service, detailed information on a command for controlling the service, and the like (F005). Based on a URL, the digital television 11 having received the GET command transmits the 200 OK response describing information specified by the controller 12 to the controller 12. Subsequently, the DLNA control unit 1202 of the controller 12 receives the 200 OK response transmitted from the digital television 11 (F006).

FIG. 9 shows an example of a 200 OK response of the digital television 11 with respect to a GET command transmitted to the service description URL 803.

In FIG. 9, reference numerals 901 and 902 denote names of commands for executing a service.

In addition, reference numeral 903 denotes names of an argument and a return value when executing a command.

According to the processing described above, the DLNA control unit 1202 of the controller 12 performs acquisition of a command for setting the service to a data request wait state from the acquired acquisition destination of the command (service description URL 803).

Subsequently, the service activation control unit 1201*b* of the controller 12 sets the service of the digital television 11 to a data request wait state using the command for setting a data request wait state acquired through the processing described above.

In addition, the DLNA control unit 1202 of the controller 32 discovers a service-providing device connected to the home network 3 and acquires a service type and a command for controlling the service according to the same procedure as that of the controller 12.

The processing of device search (F001) and presence notification (F002) shown in FIG. 6 corresponds to the processing of service search (F110) shown in FIG. 4, while processing from device description acquisition (F003) to response (F006) corresponds to service information acquisition (F111). In addition, the processing of device search (F007) and presence notification (F008) shown in FIG. 6 corresponds to the processing of service search (F103) shown in FIG. 4, while processing from device description acquisition (F009) to response (F012) corresponds to service information acquisition (F104).

Furthermore, service search (F103, F110) and service information acquisition (F104, F111) may be performed in advance before transmitting the INVITE request (F101). Moreover, in a similar manner, service search (F203, F207) and service information acquisition (F204, F208) shown in FIG. 5 may also be performed in advance before transmitting the INVITE request (F201).

The service activation control units 1201*b* of the controllers 12 and 32 are capable of creating a SOAP message to be used for transmitting a command to the service-providing device using command information acquired from the service-providing device discovered through the procedure described above.

Commands include commands as stipulated by the DLNA, commands unique to the service-providing device, and the like.

Next, a flow of processing performed by a controller upon receiving an INVITE request (session connection request) according to the present embodiment will be described.

Figure 10:
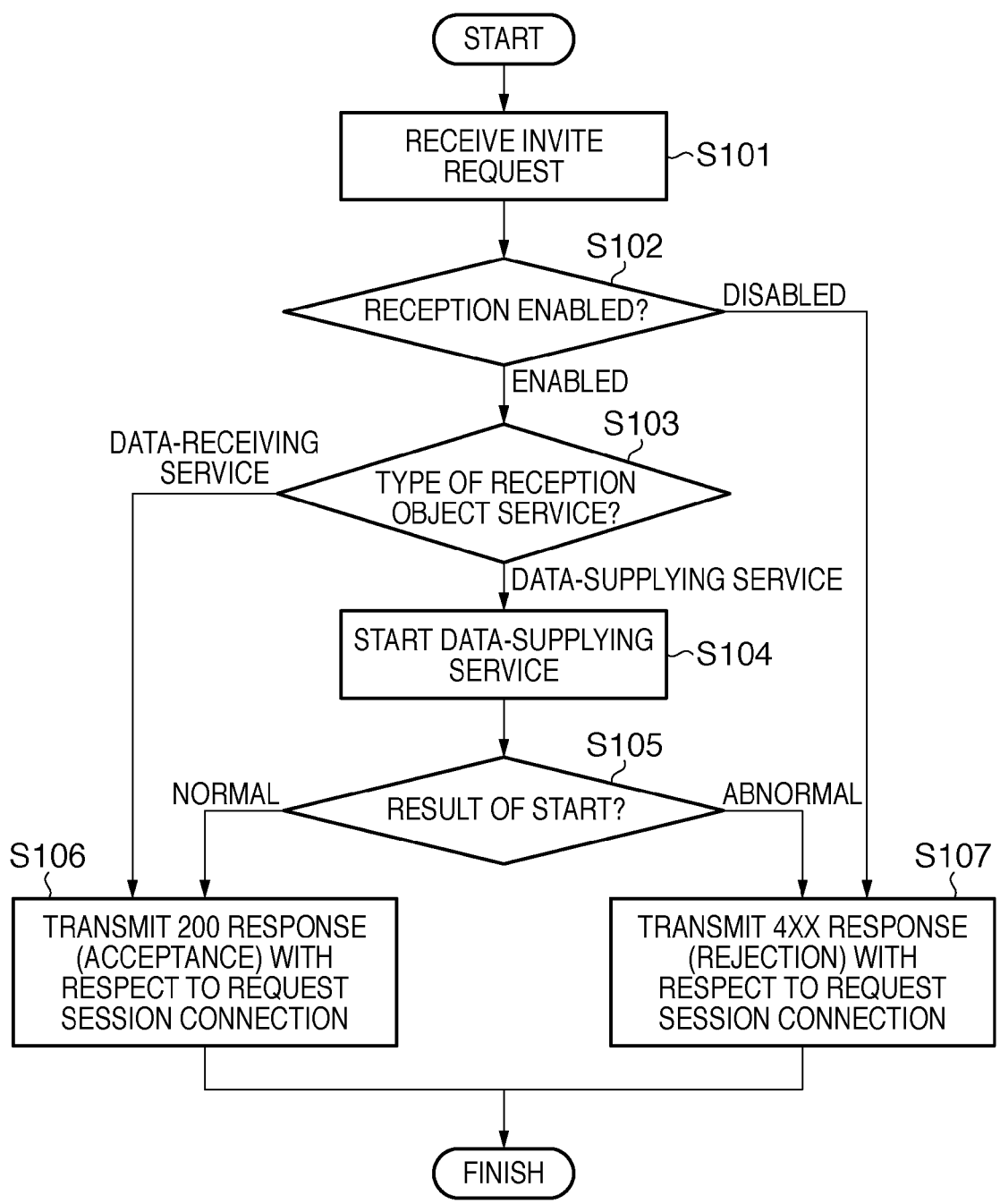
FIG. 10 is a processing flowchart during reception of a session connection request.

FIG. 10 is a flowchart showing a flow of processing (the portions indicated as S11 in FIGS. 4 and 5) performed by the controller 32 shown in FIG. 4 and the controller 12 shown in FIG. 5 having received the INVITE request. FIG. 10 shows a portion of a program to be executed by the CPU 201 that is a computer. The program is stored in the HDD 209 that is a storage medium so as to be readable by the CPU 201.

In step S101 (receiving step), when the SIP control unit 1203 receives an INVITE request that is a connection request transmitted according to a protocol (SIP) for connecting a session, the flow proceeds to step S102.

In step S102, the DLNA control unit 1202 performs discovery of a reception object service-providing device and checks service reception availability based on SDP information included in the INVITE request and information obtained through the SSDP processing described with reference to FIG. 6. In step S102, the service type determination unit 1201*a* of the controller determines a service type of the reception object service based on SDP information included in the INVITE request. When it is determined that the reception object service identified by the SDP information is receivable, the flow proceeds to step S103. On the other hand, when a reception object service does not exist, when the service cannot be provided, or when it is determined that the service is not to be provided, the flow proceeds to step S107.

In step S103, the service type determination unit 1201a of the controller verifies a service type of a service-providing device determined in step S102 to be a reception object. At this point, in the case where the service type is verified to be the data-supplying service (the storage server 31) (the case shown in FIG. 4), the flow proceeds to step S104. In the case where the service type is verified to be the data-receiving service (the digital television 11) (the case shown in FIG. 5), the flow proceeds to step S106.

In step S104 (setting step), the service activation control unit 1201b transmits a command giving the instruction for the start of service (service start request) to the storage server 31, sets the service existing in the network to a data request wait state, and proceeds to step S105. In other words, the service activation control unit 1201b sets the service existing in the network to a data request wait state using a protocol for controlling devices in a local network (DLNA). The service start request command has already been acquired in communication F104 shown in FIG. 4 by the DLNA control unit 1202.

In step S105, the DLNA control unit 1202 determines a service start result based on a response (F108) from the storage server 31. At this point, in the case where it is acknowledged that the service of the storage server 31 is normally started and a data request wait state has been set, the flow proceeds to step S106. On the other hand, in the case where the service is not normally started in step S105, the flow proceeds to step S107.

In step S106 (transmitting step), the SIP control unit 1203 transmits a 200 OK response of acceptance with respect to the INVITE request. In other words, in the case where the reception object service is a data-supplying service, the SIP control unit 1203 transmits a 200 OK response that is a response to the INVITE request after acknowledging that the service has been set to a data request wait state. At this point, in order to connect a session, the SIP control unit 1203 transmits a response to the connection request according to a protocol (SIP) for connecting a session.

In step S107, the SIP control unit 1203 transmits a 4xx response rejecting the INVITE request.

Figure 11:
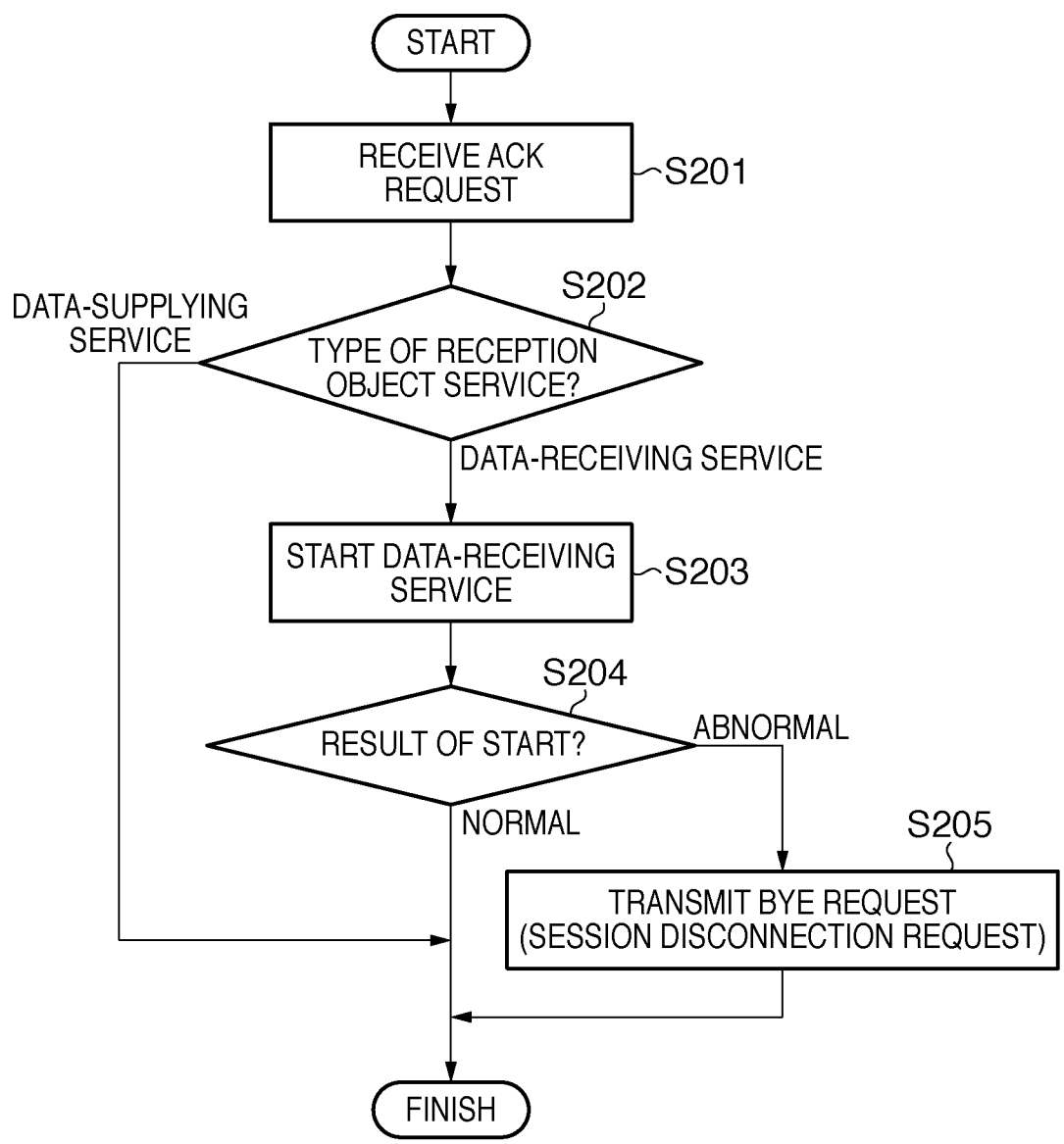
FIG. 11 is a processing flowchart during reception of a response acknowledgment.

Next, a flow of processing performed by a controller upon receiving a response acknowledgment (ACK request) from a transmitting-side controller of a session connection request according to the present embodiment will be described. FIG. 11 shows a portion of a program to be executed by the CPU 201 that is a computer. The program is stored in the HDD 209 that is a storage medium so as to be readable by the CPU 201.

FIG. 11 is a flowchart showing a flow of processing (the portions indicated as S13 in FIGS. 4 and 5) performed by the controller 32 shown in FIG. 4 and the controller 12 shown in FIG. 5 having received the ACK request.

In step S201, when the SIP control unit 1203 receives an ACK request (response acknowledgment), the flow proceeds to step S202. In step S202, the service type determining unit 1201a of the controller verifies the service type of the reception object service. Note that the service type of the reception object service has already been determined upon reception of the INVITE request (connection request) by referencing SDP information. However, the service type determination unit 1201a may once again verify the service type at this timing by referencing the SDP information.

In step S202, when the service type determination unit 1201a determines that the service type is the data-supplying service (the storage server) (the case shown in FIG. 4), the processing is terminated. On the other hand, in the case where the service type is determined to be the data-receiving service (the digital television) (the case shown in FIG. 5), the flow proceeds to step S203. Subsequently, in step S203, using the command for service start request acquired in communication F204 of FIG. 5, the service activation control unit 1201b causes the service of the digital television 11 to be started. In step S204, the DLNA control unit 1202 determines a service start result based on a response (F215) from the digital television 11. At this point, in the case where the service of the digital television 11 has been normally started, the processing is terminated. On the other hand, in the case where the service has not been normally started, the flow proceeds to step S205 in which an SIP BYE request (session disconnection request) is transmitted from the SIP control unit 1203 to the controller 32.

In steps S102, S103 and S202 of the present embodiment, the service type determination unit 1201a of the controller determines a service type based on SDP information included in the INVITE request. However, in steps S103 and S202, the service type determination unit 1201a may alternatively determine a service type based on device type 801 information or service type 802 information acquired through the aforementioned SSDP processing. For example, device type 801 information "MediaRenderer" shown in FIG. 8 indicates that a service provided by the device is a data-receiving service. In addition, there may be cases where a service type can be determined from service type 802 information.

Next, a flow of processing performed by a controller upon receiving a response (200 OK response) to a connection request according to the present embodiment will be described.

Figure 12:
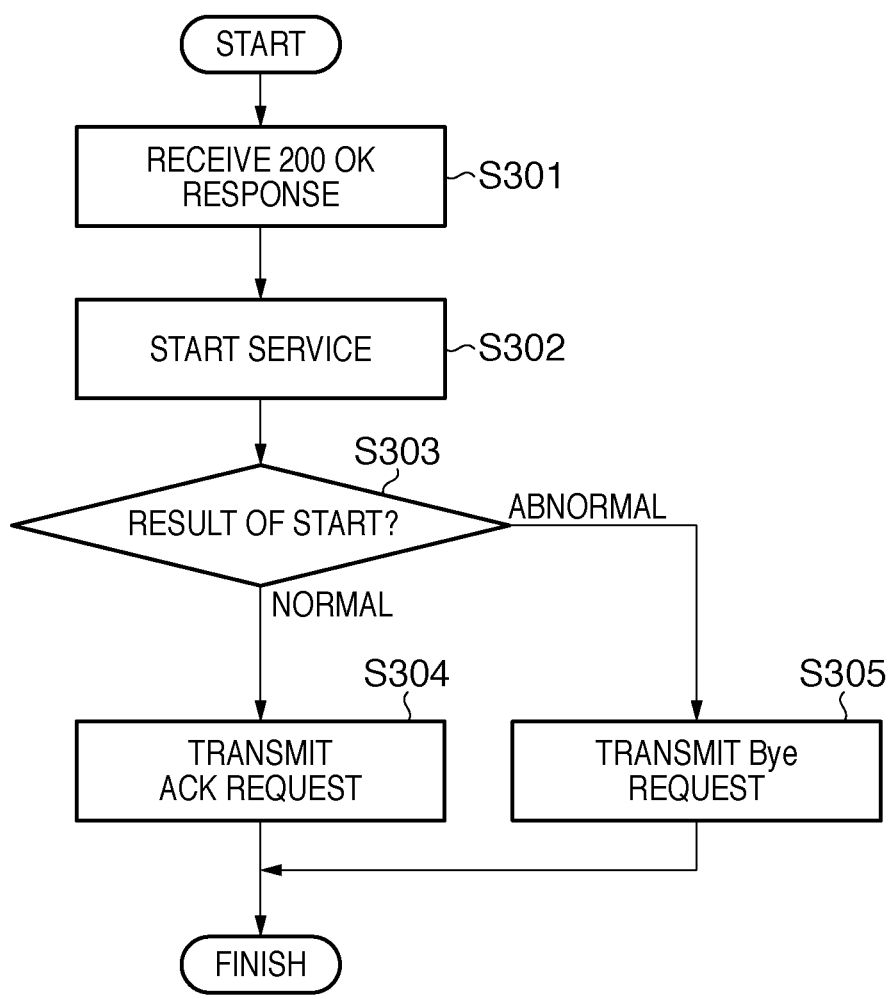
FIG. 12 is a processing flowchart during reception of a final response.

FIG. 12 is a flowchart showing a flow of processing (the portions indicated as S12 in FIGS. 4 and 5) performed by the controller 12 shown in FIG. 4 and the controller 32 shown in FIG. 5 having received the 200 OK response. FIG. 12 shows a portion of a program to be executed by the CPU 201 that is a computer. The program is stored in the HDD 209 that is a storage medium so as to be readable by the CPU 201. Moreover, prior to the processing shown in FIG. 12, a first transmitting step has been executed in which an INVITE request that is a connection request is transmitted to the network.

In step S301 (receiving step), when the SIP control unit 1203 receives a 200 OK response (response to the connection request), the flow proceeds to step S302. In other words, the SIP control unit 1203 of the controller receives a connection request from the NETIF 204 transmitted according to a protocol (SIP) for connecting a session.

Subsequently, in step S302 (setting step), the service activation control unit 1201b starts a service to be executed, sets the service existing in the network to a data request wait state, and proceeds to step S303. In other words, the service activation control unit 1201b of the controller sets the service existing in the network to a data request wait state using a protocol for controlling devices in a local network (DLNA).

In step S303, the DLNA control unit 1202 determines a service start result based on responses (F114, F211) from the service to be executed. At this point, when it is determined that the service has been normally started, the flow proceeds to step S304, and when the service has not been normally started, the flow proceeds to step S305.

In step S304 (second transmitting step), the SIP control unit 1203 transmits an ACK request (response acknowledgment) to the transmission source of the 200 OK response and terminates the processing. In other words, the SIP control unit 1203 transmits a response acknowledgment to the response according to a protocol (SIP) for connecting a session. In this manner, in the present embodiment, the SIP control unit 1203 transmits a response acknowledgment (ACK request) to the OK response after it is acknowledged in step S303 that the service has been set to a data request wait state.

In step S305, the SIP control unit 1203 transmits a SIP BYE request (session disconnection request) to the transmission source of the 200 OK response and terminates the processing.

Other Embodiments

For sake of simplicity, the embodiment described above has been arranged so that only one service-providing device is to be connected to a single controller. However, two or more devices can also be connected. In addition, while the embodiment described above has been arranged so that two home networks are to be connected to the Internet 2, three or more home networks can be connected instead.

Furthermore, while the embodiment described above has been arranged so as to use a storage server as a device providing a data-supplying service and a digital television as a device providing a data-receiving service, the present invention is not limited to such an arrangement. Conceivable examples of devices providing a data-supplying service include a PC storing various content data, a work station, a notebook PC, a palmtop PC, a mobile telephone and a PDA, as well as various home appliances such as a digital camera, a video camera and the like. Furthermore, conceivable examples of devices providing a data-receiving service include a PC capable of outputting various content data, a work station, a notebook PC, a palmtop PC, a mobile telephone, a PDA and a printer, as well as various home appliances such as a digital camera, a video camera and the like.

A case will now be considered where a connection request is transmitted from the side of a network of a digital camera providing a data-supplying service to a network of a printer providing a data-receiving service and, based on the establishment of a session, image data is transmitted and an image is printed. When doing so, there may be cases where printing cannot not be performed even when the service of the printer has been started due to reasons such as a paper having a size suitable for the printer has not been set, the printer has run out of ink, and the like. In such a case, an error message may be arranged to be transmitted from the printer to a user on the connection request transmitting-side network. Such an arrangement enables the user to become aware of a state where the data-receiving service of the printer has been started but the printer is unable to perform printing.

In addition, a case will be considered where a connection request is transmitted from a network to which is connected an HD (hard disk) recorder as a device providing a data-supplying service to a network to which is connected a DVD recorder as a device providing a data-receiving service. In this case, based on the establishment of a session, video data is transmitted from the HD recorder and recorded by the receiving-side DVD recorder. When doing so, there may be cases where recording cannot not be performed even when the service of the DVD recorder has been started due to reasons such as not being able to secure a storage area having a size sufficient to store video data. In such a case, an error message may be arranged to be transmitted from the DVD recorder to a user on the connection request transmitting-side network. Such an arrangement enables the user to become aware of a state where the data-receiving service of the DVD recorder has been started but recording cannot be performed.

Moreover, in the embodiment described above, while an example has been presented of a case where a controller to receive an INVITE request (connection request) and a device to provide a service are separate devices, the present invention can be realized even in the case the devices are the same.

Furthermore, in the above embodiment, a type of service to become a reception object is determined based on SDP information included in an INVITE request (connection request). However, the determination need not be limited to this method and, for example, a determination may be made by registering, in advance, service type information corresponding to receiving numbers to a receiving-side controller.

The object of the present invention can also be achieved by the mode described below. That is, a storage medium storing a program code of software realizing the functions of the embodiment described above is supplied to a system or a device. Subsequently, a computer (or a CPU or an MPU) of the system or the device reads out and executes the program code stored in the storage medium. In this case, the program code itself that is read out from the storage medium realizes the functions of the embodiment described above, whereby the storage medium storing the program code constitutes the present invention.

Examples of the storage medium for supplying the program code may include a floppy disk, a hard disk, an optical disk, a magnetic optical disk, a CD-ROM, a CD-R, a magnetic tape, a nonvolatile memory card, a ROM, a DVD, and the like.

Furthermore, the present invention is not limited to a mode in which the functions of the embodiment described above are realized by executing a program code read out by a computer. That is, the present invention includes a case where an operating system (OS) or the like running on a computer performs a part or all of the actual processing based on instructions of the program code, thereby realizing functions of the embodiment described above.

Moreover, the present invention also includes the mode described below. That is, a program code read out from a storage medium is written into a memory provided either on an expansion card inserted into a computer or in an expansion unit connected to the computer. Subsequently, a CPU or the like provided on the expansion card or the expansion unit performs a part of or all of the actual processing based on instructions contained in the program code, thereby realizing the functions of the embodiment described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-235415, filed on Sep. 11, 2007, which is hereby incorporated by reference herein in its entirety.

What is claimed is:

1. A communication apparatus connected to a first network, said apparatus comprising:
   a receiving unit that receives, from a communication control apparatus in a second network, a connection request for connecting the first and second networks;
   a sending unit that sends a first command to a first device in the first network for setting the first device to a data request wait state in accordance with receiving the connection request, the first device providing a service having been discovered in the first network; and
   a transmitting unit that transmits, to the communication control apparatus in the second network, a response to the connection request after the first device in the first network has been set to the data request wait state, wherein the sending unit transfers a second command to the first device, wherein the second command is transmitted from a second device in the second network which has been connected with the first network based on the connection request.

2. The apparatus according to claim 1, wherein said sending unit comprises:
an acquiring unit that acquires an acquisition destination of the first command for setting the first device to the data request wait state; and
a command acquiring unit that acquires the first command from the command acquisition destination acquired by said acquiring unit, and
wherein said communication apparatus sets the first device to the data request wait state using the first command acquired by said command acquiring unit.

3. The apparatus according to claim 1, wherein said sending unit comprises:
a verifying unit that verifies a state of the service; and
a selecting unit that selects the first command to be used for setting the first device to the data request wait state at said sending unit based on the state of the service verified by said verifying unit.

4. The apparatus according to claim 1, wherein said receiving unit receives the connection request transmitted according to a protocol for connecting a session,
wherein said sending unit sets the first device to the data request wait state using a protocol for controlling devices in a local network, and
wherein said transmitting unit transmits the response according to the protocol for connecting the session.

5. The apparatus according to claim 1, wherein in a case where the service performed at the first network in accordance with a reception of the connection request is a data transmitting service, said sending unit sets the data transmitting service in the first network to the data request wait state in accordance with the reception of the connection request and said transmitting unit transmits the response to the connection request in accordance with the data transmitting service having been set to the data request wait state, and
wherein in a case where the service performed at the first network in accordance with the reception of the connection request is a data-receiving service, said transmitting unit transmits the response to the connection request without setting the service in the first network to the data request wait state, and said sending unit causes the data-receiving service to start a data request in accordance with receiving a response acknowledgment to the response.

6. A control method of a communication apparatus connected to a first network, said method comprising:
receiving, from a communication control apparatus in a second network, a connection request for connecting the first and second networks;
sending a first command to a first device in the first network for setting the first device to a data request wait state in accordance with receiving the connection request, the first device providing a service having been discovered in the first network;
transmitting, to the communication control apparatus in the second network, a response to the connection request after the first device in the first network has been set to the data request wait state; and
transferring a second command to the first device, wherein the second command is transmitted from a second device in the second network which has been connected with the first network based on the connection request.

7. The method according to claim 6, wherein said sending step comprises the steps of:
acquiring an acquisition destination of the first command for setting the first device to the data request wait state; and
acquiring the first command from the command acquisition destination acquired in said acquiring step,
wherein said sending step sets the first device in the first network to the data request wait state using the first command acquired in said command acquiring step.

8. A non-transitory storage medium storing a computer program to be executed by a computer connected to a first network, said computer program effecting a method comprising:
receiving from a communication control apparatus in a second network, a connection request for connecting the first and second networks;
sending a first command to a first device in the first network for setting the first device to a data request wait state in accordance with receiving the connection request, the first device providing a service having been discovered in the first network;
transmitting, to the communication control apparatus in the second network, a response to the connection request after the first device in the first network has been set to the data request wait state; and
transferring a second command to the first device, wherein the second command is transmitted from a second device in the second network which has been connected with the first network based on the connection request.

9. The storage medium according to claim 8, wherein said sending step comprises the steps of:
acquiring an acquisition destination of the first command for setting the first device to the data request wait state; and
acquiring the first command from the command acquisition destination acquired in said acquiring step,
wherein said sending step sets the service in the first network to the data request wait state using the first command acquired in said command acquiring step.

* * * * *